(12) United States Patent
Guang (10) Patent No.: US 9,338,853 B2
(45) Date of Patent: May 10, 2016

(54) LED TUBE DRIVER CIRCUITRY FOR BALLAST AND NON-BALLAST FLUORESCENT TUBE REPLACEMENT

(71) Applicant: GRECO TECH INDUSTRIES INC., Burnaby (CA)

(72) Inventor: Luo Hua Guang, Xiamen (CN)

(73) Assignee: Greco Tech Industries Inc., Burnaby, BC (CA)

( * ) Notice: Subject to any disclaimer, the term of this patent is extended or adjusted under 35 U.S.C. 154(b) by 6 days.

(21) Appl. No.: 14/488,362

(22) Filed: Sep. 17, 2014

(65) Prior Publication Data

US 2016/0081147 A1    Mar. 17, 2016

(51) Int. Cl.
| | |
|---|---|
| *H05B 37/00* | (2006.01) |
| *H05B 33/08* | (2006.01) |
| *F21K 99/00* | (2016.01) |
| *F21V 23/00* | (2015.01) |
| *F21V 23/02* | (2006.01) |
| *F21Y 103/00* | (2016.01) |

(52) U.S. Cl.
CPC .............. *H05B 33/089* (2013.01); *F21K 9/175* (2013.01); *F21V 23/002* (2013.01); *F21V 23/006* (2013.01); *F21V 23/009* (2013.01); *F21V 23/026* (2013.01); *H05B 33/0812* (2013.01); *H05B 33/0851* (2013.01); *F21Y 2103/003* (2013.01)

(58) Field of Classification Search
CPC ........ H05B 37/00; H05B 37/02; H05B 33/08; H05B 33/0803; H05B 33/0884; H05B 33/0809; H05B 33/0815; F21V 29/00; F21V 23/04; F21K 9/17; F21Y 2010/02; F21Y 2103/003; F21S 4/00

USPC .......... 315/200 R, 224–226, 209 R, 291, 307, 315/308; 362/217.01, 218, 249.01, 249.02, 362/294, 373

See application file for complete search history.

(56) References Cited

U.S. PATENT DOCUMENTS

| | | | |
|---|---|---|---|
| 6,283,612 B1 | 9/2001 | Hunter | |
| 6,853,151 B2 * | 2/2005 | Leong | H05B 33/0809 315/185 R |
| 7,441,922 B2 | 10/2008 | Huang | |
| 7,478,924 B2 | 1/2009 | Robertson | |
| 7,488,086 B2 | 2/2009 | Wu | |
| 7,507,001 B2 | 3/2009 | Kit | |
| 7,877,226 B2 | 1/2011 | Huang | |
| 8,083,373 B2 | 12/2011 | Zimmerman | |
| 8,096,683 B1 | 1/2012 | Burrell, IV | |
| 8,319,433 B2 | 11/2012 | Lin | |
| 8,330,381 B2 | 12/2012 | Langovsky | |

(Continued)

FOREIGN PATENT DOCUMENTS

| | | |
|---|---|---|
| CA | 2758900 | 6/2012 |
| CA | 2651224 | 5/2013 |

*Primary Examiner* — Jimmy Vu (57) ABSTRACT

An LED lamp tube and driver circuit that is direct replacement for fluorescent tubes with or without ballasts, that works with standard AC high voltage current input, with high frequency pulse current input, or with lower voltage input. The tube is wired to receive the current that is input from any two electrode pins from among the pairs of pins at the ends of the tube, which house the driver circuitry. The input current is converted to DC through a rectifier circuit, is filtered of unwanted frequencies and voltage through a filter circuit, and is controlled with a step-down constant current circuit to drive an LED array within the tube.

30 Claims, 4 Drawing Sheets

(56) References Cited

U.S. PATENT DOCUMENTS

| | | |
|---|---|---|
| 8,358,056 B2 | 1/2013 | Park |
| 8,668,361 B2 | 3/2014 | Hasnain |
| 8,678,610 B2 | 3/2014 | Simon |
| 2008/0231204 A1 | 9/2008 | Praiswater |
| 2009/0261706 A1 | 10/2009 | Sorella |
| 2010/0019689 A1 | 1/2010 | Shan |
| 2010/0214779 A1 | 8/2010 | Kao |
| 2010/0232154 A1 | 9/2010 | Chen |
| 2011/0006688 A1 | 1/2011 | Shim |
| 2011/0121756 A1 | 5/2011 | Thomas |
| 2012/0153865 A1 | 6/2012 | Rolfes |
| 2012/0161666 A1 | 6/2012 | Antony et al. |
| 2012/0229040 A1 | 9/2012 | Brown |
| 2014/0001970 A1 | 1/2014 | Park |
| 2014/0104824 A1* | 4/2014 | Hsia .................. F21V 25/04 362/221 |

\* cited by examiner

LED TUBE DRIVER CIRCUITRY FOR BALLAST AND NON-BALLAST FLUORESCENT TUBE REPLACEMENT

FIELD OF INVENTION

This invention relates to a novel device in the general field of illumination, and more specifically to a versatile energy saving LED tube lamp and drive circuitry that may be powered from many commonly available compatible fluorescent fixtures including those with or without ballasts as well as those with or without shunted sockets.

BACKGROUND OF THE INVENTION

Fluorescent Lamps and Ballasts

There are multitudinous installations of fluorescent lamps in buildings throughout the world. The fluorescent lamp provided more uniform illumination and less costly operation than incandescent bulbs having a primary illumination filament that would burn out sooner than a typical fluorescent lamp. A fluorescent lamp consists of a glass tube filled with an inert gas (usually argon) at low pressure. On each side of the glass tube is an electrode. Electricity is passed through the gas, causing an arc of illumination. The glass tube is fitted into a fixture having sockets that receive electrode pins at an end of the glass tube. The sockets are sized to accept different standard diameter tubes, such as T12 (old and inefficient) with a diameter of 1.5 inches, T8 (higher in efficiency than T12) with 1 inch diameter). Both T12 and T8 lamps use the same medium bi-pin base, which allows T8 lamps to fit into the same fluorescent luminaire fixture as T12 lamps of the same length.

To get the fluorescent lamp started a spike of high voltage is needed to get the arc started. The colder the lamp is, the higher voltage that is needed to start the arc. The voltage drives current through the argon gas. Gas has an electrical resistance—the colder the gas, the higher the resistance, and the higher the voltage required to start the arc. Since creating a high voltage can be hazardous and expensive, ways were found to pre-heat the fluorescent lamp in order to require less voltage to start the lamp. There are different ways to start a lamp including: preheat, instant start, rapid start, quick start, semi-resonant start and programmed start. All of these require electronics which are part of a ballast for the lamp. An electrical ballast is a device that intended to limit the amount of current in an electric circuit. The ballast for a fluorescent lamp limits the current through the tube, which would otherwise rise to destructive levels due to the tube's negative resistance characteristic. A fluorescent (gas-discharge) lamp is an example of a device having negative resistance, where after lamp ignition, the increasing lamp current tends to reduce the voltage fed across it. The resistance equals the voltage divided by the current (Ohms Law). The resistance is therefor decreased if the voltage decreases or if it stays constant while the current increases. The resistance is thus lowered by increases in current (negative resistance). A simple series current limiting reactor (inductor) can effectively be the ballast for a lamp. However most modern ballasts have complex (expensive) electronics to control precisely the current or the voltage supplied to a fluorescent lamp. The lamp's ballast regulates the required alternating current (AC) electrical power delivered via the electrodes of the lamp. The ballast is typically physically located in a box mounted near its lamp or lamps. Older lamps used a separate starter to get the lamp' arc going. Modern lamps use an electrical pulse start which is delivered to the lamp by components within the ballast.

Historically, fluorescent lamps use AC power, effectively meaning that the electrode that functions as the cathode switches back and forth. If the lamp was DC, the cathode side would be brighter and more intense than the anode side since there are more free electrons spewing off of the (typically tungsten) electrode that performs as the cathode, and that side would become weaker as it lost atoms, causing the lamp to not last compared to an AC fluorescent lamp. Using AC, the electrons/ions leave one side of the lamp for the other but on the next (alternate) cycle go back. With AC, the lamp tube has a practically uniform brightness on both ends.

As electrical current forms an arc through the lamp, it ionizes a higher percentage of the tube's contained gas molecules. The more molecules that are ionized, the lower the resistance of the gas. If too many gas molecules are ionized, the resistance will drop to the point that an electrical short would occur. Therefore, the ballast also contains electronic components that control the current, preventing the current through the lamp from rising to the point that the lamp would burn out. Electronic ballasts use semiconductors to limit power to a fluorescent lamp. First the ballast rectifies the AC power, then it converts to a high frequency for improved efficiency. Electronic ballasts typically change the frequency of power to a lamp from 50/60 Hz to about 20 kHz. A modern electronic ballast can more precisely control power than an older magnetic ballast.

Types of Ballasts

Modern ballasts vary considerably in type and complexity. An instant start ballast does not preheat the electrodes, instead using a relatively high voltage (~600 V) to initiate the discharge arc. It is the most energy efficient type of ballast, but results in the fewest on and off cycles for the lamp tube, as molecules of material is lost from the surface of the lamp tube's cold electrodes each time the lamp is turned on. Instant-start ballasts are used for applications with long duty cycles, in buildings the fluorescent lamps are not frequently turned on and off. Instant start lamps have a single pin (the cold cathode), and a high voltage spike is used to start the lamp. In contrast, a rapid start ballast is used for fluorescent lamps having a filament (two electrode pin lamp) that is used for pre-heating before the lamp is started. A rapid start ballast applies voltage and heats the two electrode pins (the cathodes) simultaneously. The rapid start ballast provides superior lamp life and more cycle life, but uses slightly more energy as the cathodes in each end of the lamp continue to consume heating power as the lamp operates. Because a 2-pin lamp is used with a ballast that preheats a filament for the electrode pins prior to starting the lamp, a lower voltage suffices to then start the lamp. A programmed-start ballast is a more advanced version of the rapid start ballast. The T5 lamp specification calls for a programmed-start, that provides precise heating of lamp filaments and controls the pre-heat time before the startup voltage is applied, thereby reducing filament stress. The programmed-start ballast applies power to the filaments first, which allows the cathodes to preheat and then applies voltage to the lamps to strike an arc. Lamp life typically operates up to 100,000 cycle life with programmed start ballasts. Once started, the programmed-start ballast's filament voltage is reduced to increase operating efficiency. This ballast gives the best life and most starts from lamps, and so is preferred for applications with very frequent on/off switching. Programmed start ballasts heat the electrodes first, reducing the shock to the lamp, maximizing both lamp and ballast life. Programmed start ballasts are the most expensive, but may be cost-effective by reducing lamp deterioration.

Shunted and NonShunted Sockets

It can be difficult to determine whether a fluorescent lamp fixture has an instant-start ballast or a rapid start ballast without locating the ballast and looking at its wiring diagram, which is usually affixed to the ballast. An instant-start has only wire coming from the ballast to one of the lamp end's socket, with the pins of that socket connected electrically (shunted). A rapid-start ballast has two wires coming from the ballast to one end of the lamp end's socket, with the pins of that socket not connected electrically (non-shunted). The lamp fixture often has two sockets facing either other, adapted to receive a straight lamp tube. The two pins of an Non-shunted socket connected to the ballast are for receiving power while the corresponding pins on the other socket are for physically securing the tube only. Many manufacturers use the same-looking socket for both shunted and Non-shunted sockets, with only a hidden wire doing the shunting if present. A shunted ballast merely connects two of the pins at either end of the lamp, whereas an Non-shunted ballast will bring the contact from each of two pins out to a separate connection back to the ballast. Counting both sockets (one at each end of the fluorescent fixture (lampholder)), a shunted lampholder will generally have 2 holes (or accept 2 wires) on the unit whereas an non-shunted lampholder will have 4 holes (or accept a total of 4 wires) on the unit. Ballast bypass requires cutting the wires between the ballast and the lamp socket, and re-routing the electrical supply wires from the input side of the ballast directly to the lamp socket. It may also entail physical detachment and removal of the unused ballast from the premises. In the case of ballasts that are physically remote from the lamp fixture, this can be especially time-consuming. Determining the kind of ballast system, shunted or Non-shunted, and identifying the status of wires connected to fluorescent fixture due for replacement with an LED tube can be time-consuming. There may be fluorescent fixtures that have been either neglected or prepared previously for LED replacement by having the ballast already removed, without any indication on the fixture of this status, and determining the status can also result in expense in the absence of the present invention.

Disadvantages of Fluorescent Lighting

Notwithstanding their advantages over incandescent light bulbs, fluorescent lamps have a number of problems. The fluorescent lamps can be highly efficient, but poorly made older ballasts can release noxious gases upon overheating. Electromagnetic ballasts with a minor fault can produce an audible humming or buzzing noise. Magnetic ballasts are usually filled with a tar-like compound to reduce emitted noise. The tar can melt or release gas. Hum is eliminated in lamps with a high-frequency electronic ballast, but even modern electronic ballasts can fail due to overheating. Additionally, fluorescent lamps emit a small amount of ultraviolet (UV) light. Fluorescent lamps with older magnetic ballasts flicker at a normally unnoticeable frequency of 100 or 120 Hz but this flickering can cause problems for some individuals with light sensitivity. Sensitive people may experience health problems that is aggravated by artificial lighting. The ultraviolet light from a fluorescent lamp can even adversely affect paintings, requiring that artwork be protected with transparent glass or acrylic filters. Fluorescent lamps generate harmonic currents in the electrical power supply within the ballast. The arc itself within the lamp generates radio frequency noise, which can be transmitted through power wiring. Radio signal suppression is available, but adds to the cost of the fluorescent fixtures. Fluorescent lamps operate optimally at typical room temperatures. At other temperature ranges, whether hotter or colder, efficiency decreases. At below-freezing fluorescent lamps may not start. Regarding outdoor use, fluorescent lamps do not generate as much heat as incandescent lamps and may not sufficiently melt snow or ice on the lamp, reducing illumination. If the lamp is frequently switched on and off, the lamp will rapidly age, because each start cycle slightly erodes the electron-emitting surface of the cathodes—when all the emission material is used up, the lamp cannot be started with the available ballast voltage. If a fluorescent lamp is broken, a very small amount of mercury can contaminate the surrounding environment. The broken glass itself is a hazard.

Replacement of Fluorescent Lighting with LEDs

For all the above reasons, there has been over the past decade an enormous commercial move toward replacing both incandescent and fluorescent light fixtures with light-emitting diode (LED) lighting. Arrays of LEDs can be fitted in tubes that are physically compatible replacement for fluorescent tubes, using the same sockets for their electrodes to fit into.

LEDs have advantages over those prior light sources: lower energy consumption, longer life, improved robustness, smaller size, and the ability to be switched on and off faster. Some LEDs can achieve full brightness in under a microsecond. LEDs emit more lumens per watt than incandescent light bulbs and most fluorescent tubes. LED lighting efficiency is not affected by shape and size, unlike fluorescent light bulbs or tubes. LEDs can be used that emit light of an intended color without using the filters that incandescent or fluorescent lighting would require to achieve the same effect. LED tube lights are available in different lengths with both clear and frosted lens styles, in a selection of 3000K, 4000 k or 5000K color temperatures, depending on whether visibly "cool" or "warm" lighting is desired. LEDs can easily be dimmed either by pulse-width modulation or lowering the current to them, whereas fluorescent lamps can require expensive circuitry to dim, and many use older ballasts that cannot provide dimming at all, the ballast requiring a standard (undimmed) input of AC power. Unlike other light sources, LEDs designed for visible light illumination radiate very little heat in the form of IR that can cause damage to sensitive objects or fabrics. Wasted energy is dispersed as heat through the base of the LED. LED lights require no warm up time, require virtually no maintenance, and have a long life expectancy. Eventual failure of LEDs occurs usually by dimming over time, rather than the sudden failure of incandescent bulbs, or the unpleasant erratic output of failing fluorescent lamps and ballasts. LED arrays can have 35,000 to 50,000 hours of life, compared to typical ratings for fluorescent tubes typically of 10,000 to 15,000 hours, depending on the ambient conditions, and for incandescent light bulbs typically of only 1,000 to 2,000 hours. Reduced maintenance costs from the use of LEDs with their extended lifetime, rather than energy savings, is often the more significant factor in determining the payback advantage for switching to LED lighting. LEDs are light weight and extremely durable as they are solid-state components, which are difficult to damage with external shock, unlike fluorescent and incandescent bulbs, which are fragile. To summarize, LED lights are eco-friendly lights that require no ballast, and offer maximum light output and energy savings. Compared to conventional fluorescent lamps, replacement can save more than 50% of the energy use, which pays for the replacement over time.

LEDs for general room lighting require more precise current and heat management than compact fluorescent lamp sources of comparable output. A light-emitting diode (LED) is a two-lead semiconductor light source. When a fitting voltage is applied to the leads, electrons combine with electron holes within the device, releasing energy as photons. This effect is called electro luminescence, and the color of the emitted light corresponds to the energy of the photon, controlled by the energy band gap of the semiconductor. The current-voltage characteristics of an LED is like other diodes, that is, the current is dependent exponentially on the voltage. A small change in voltage causes a large change in current. If the supplied voltage exceeds the LED's forward voltage drop by a small amount, the current rating may be exceeded by a large amount, potentially damaging or destroying the LED. A solution is to use constant-current power supplies to keep the current below the LED's maximum current rating. Most LED fixtures drawing from AC wall receptacle power must have a driver circuitry that includes a power converter with at least a current-limiting resistor.

Replacing either an instant-start, shunted socket fluorescent lamp or a rapid-start non-shunted socket fluorescent lamp with a replacement LED tube and driver has previously required the ballast to be electrically detached or physically removed from the system, and the standard AC power wires to be attached directly to the driver's circuitry. Detachment can be expensive, typically requiring the services of a licensed electrician. Removal can also be time-consuming, requiring access to the ballast itself, which is often behind lamp fixture or ceiling panels.

To summarize, a fluorescent tube lamp requires a means to limit current flow to prevent a self-destroying positive feedback loop. The most common means to regulate current flow is to use an inductive ballast; consequently ballasted fluorescent fixtures are ubiquitous in the lighting industry. With the advent of power efficient high intensity LED lighting arrays, which have lumen output and power efficiencies on par with or exceeding fluorescent tube lamps, a need exists for replacement LED tube lamps that can accept power from to existing fluorescent fixtures with little or no additional adjustment. One should be able to plug an LED tube lamp into any size compatible fluorescent fixture (with or without ballast or shunt) and have the internal circuitry utilize the supplied energy to power the LED array. The known prior art solutions include using direct line voltage to power a secondary LED power supply while bypassing ballasted input power or physically removing the ballast altogether. Other solutions use back up battery power to supply the LED array, again bypassing the original ballasted input supply. None of the existing LED tube replacement lamps can be directly supplied from fluorescent fixtures with different configurations such as with or without ballasts, or with or without shunts. Existing methods are complex, inefficient, often requiring a separate power supply, and they are not adaptable to different fixture configurations.

SUMMARY OF THE INVENTION

The invention is an LED lamp tube and driver circuit that works with standard AC high voltage current input into either end of the lamp tube, that is, with no ballast, and that also works with a ballast delivering its high frequency pulse current or lower voltage input, in either case converting the power input to constant direct current (DC) to light up the LED lamp tube. The LED lamp and driver circuit works in a ballasted socket whether its ballast is instant start with a shunted socket or whether its ballast is rapid-start with an non-shunted socket.

The LED lamp tube and driver circuit is a direct replacement for fluorescent tubes with or without ballasts. The LED tube and driver circuit is thus a self-ballasted lamp, and is a direct replacement unit with or without retro-fitting adjustments to the electrical wiring or physical structure of a pre-existing fluorescent lamp.

The invention obviates the need to determine what kind of ballast a fluorescent fixture might have before replacement of its tube with the device. The device also makes unnecessary the detachment or removal of the ballast for the fixture before the replacement, The device also allows the option of detaching or removing the fixture's ballast at a later time. Either end of replacement tube can be plugged into either end of the fluorescent fixture having the tube to be replaced.

The input power, whether standard wall socket AC (110V) or as governed and supplied by the fixture's ballast, is fed to either end of the LED lamp tube replacement of the invention. Its driver circuit's input receives the input power, rectifies the AC to DC by means of one of two rectifier sub-circuits, feeds it to a filter circuit that absorbs surge voltage, and then feeds the resulting DC to a step-down constant current circuit that delivers appropriate DC power to an array of LEDs within the lamp tube. The step-down constant current circuit may have an output voltage magnitude that is either greater than or less than the input voltage magnitude. The driver circuit thus deals with a variety of characteristics of the electrical power input and distributes DC to the LEDs appropriately, whether there is one-sided or two-sided power input to the device.

The invention is essentially an LED driver circuit for fluorescent tube replacement comprising:

a) a tube for enclosing an LED light source, the tube having a first end cap and a second end cap, each of the first and second end caps having a pair of electrode pins;

b) a rectifier circuit having four input diodes, each input diode having an input lead connected to one of the electrode pins, and each input diode having output leads that are connected to provide DC output from the rectifier circuit;

in which DC output from the rectifier circuit is conducted to a constant current circuit that converts the DC output from the rectifier circuit into constant DC output for driving the LED light source.

In a preferred embodiment, the rectifier circuit has two pairs of additional diodes, each pair of additional diodes being looped in parallel with a capacitor connected to the DC output from the rectifier circuit, to provide a stabilizing flyback loop from the DC output of the rectifier circuit back to the input leads of the input diodes, and the DC output from the rectifier circuit is conducted to the constant current circuit via a filter circuit that filters out surge voltage from the DC output from the rectifier circuit. A least three of the input leads should each have a fuse in series between the input lead and its respective input diode. The rectifier circuit preferably has two pairs of additional diodes, each pair of additional diodes being looped in parallel with a capacitor connected to the DC output from the rectifier circuit, to provide a stabilizing flyback loop from the DC output of the rectifier circuit back to the input leads of the input diodes. The filter circuit preferably comprises at least one combination of a resistor and an inductor in parallel, the combination being in series with the DC output of the rectifier circuit to filter out unwanted current frequencies of the DC output, a temperature-sensitive relay switch that opens if the filter circuit exceeds a safe temperature range for the driver circuit, and a varistor that grounds excessive voltage spikes in the DC current from the rectifier circuit, and at least one capacitor in series with DC output from the rectifier circuit to ground.

The constant current circuit may also be characterized as a step-down constant current circuit, as it would typically be converting rectifier filter circuit output current to a lower voltage. However there could be circumstances in which an LED array is used in the tube that calls for conversion to a higher voltage and the system can provide accordingly. An IC drives the step-down constant current circuit part of the driver circuitry, keeping it in constant on-time operation determining whether a transistor should be turned ON or OFF to achieve low switching losses and a high power efficiency.

In a preferred physical layout the rectifier circuit is on a first PCB located in the first end cap and the constant current circuit is on a second PCB located in the second end cap, with two conductor wires running the length of the tube to connect a first pair of electrode pins on the second end cap to their respective input diodes in the rectifier circuit and two short conductors connecting a second pair of electrode pins on the first end cap to their respective input diodes in the rectifier circuit. The current from the rectifier and filter circuitry is connected via two rectifier/filter output wires to a first 2-pin connector connected at a first end of an LED array board, where the connection proceeds to two conductors to a second 2-pin connector at an opposite end of the LED array board. A second 2-pin connector is connected to an input side of the constant current circuit, and an output side of the constant current circuit being connected by a third 2-pin connection to a positive terminal and a negative terminal for electrical supply to the LED array board.

The LED Tube Driver Circuitry for Ballast and Non-ballast Fluorescent Tube Replacement is thus designed to provide an adaptable solution that provides a plug-in replacement for similarly sized fluorescent tubes, regardless of whether or not the tube to be replaced is connected to a ballast or non-ballast system, or to shunted or non-shunted sockets. The disclosed invention utilizes ballasted power when available or can bypass a ballast when necessary. The invention can work with shunted sockets as well as non-shunted socket inputs. By "socket" is meant the holder for the tube's pins at each end of the fluorescent fixture. Each holder typically includes two channels each having electrical contacts, but either or both such channels may be merely a mechanical holder where no electrical contact or supply is needed for one or two of the pins at one end of the tube. Correspondingly, the pair of pins at each end of the tube of the present invention are termed "electrode pins" as each is capable of conducting electrical power from the socket, but any particular electrode pin may function solely as a mechanical pin for a merely mechanical holder channel in the socket at which no electrical contact or no electrical power is present, the electrical supply for the tube arriving via two of the other electrode pins. The driver circuitry provides that either end of the replacement tube can be plugged into either end socket of the fluorescent fixture having the tube to be replaced, regardless of which of the four channels within the two opposing end sockets of the fixture has active electrical contacts that supply electrical power to the tube of the present invention to be fitted and secured between the sockets.

By this means, the present invention allows the direct and versatile replacement of less efficient fluorescent tubes with more efficient and more reliable LED arrays, while adapting to existing fixture electrical and mechanical configurations, and while more efficiently utilizing the power provided by the original fixture. The present invention allows installers direct fluorescent tube replacement into various fixture configurations without the need for rewiring, calibration, additional power supplies, or accompanied power losses.

DETAILED DESCRIPTION

Figure 1:
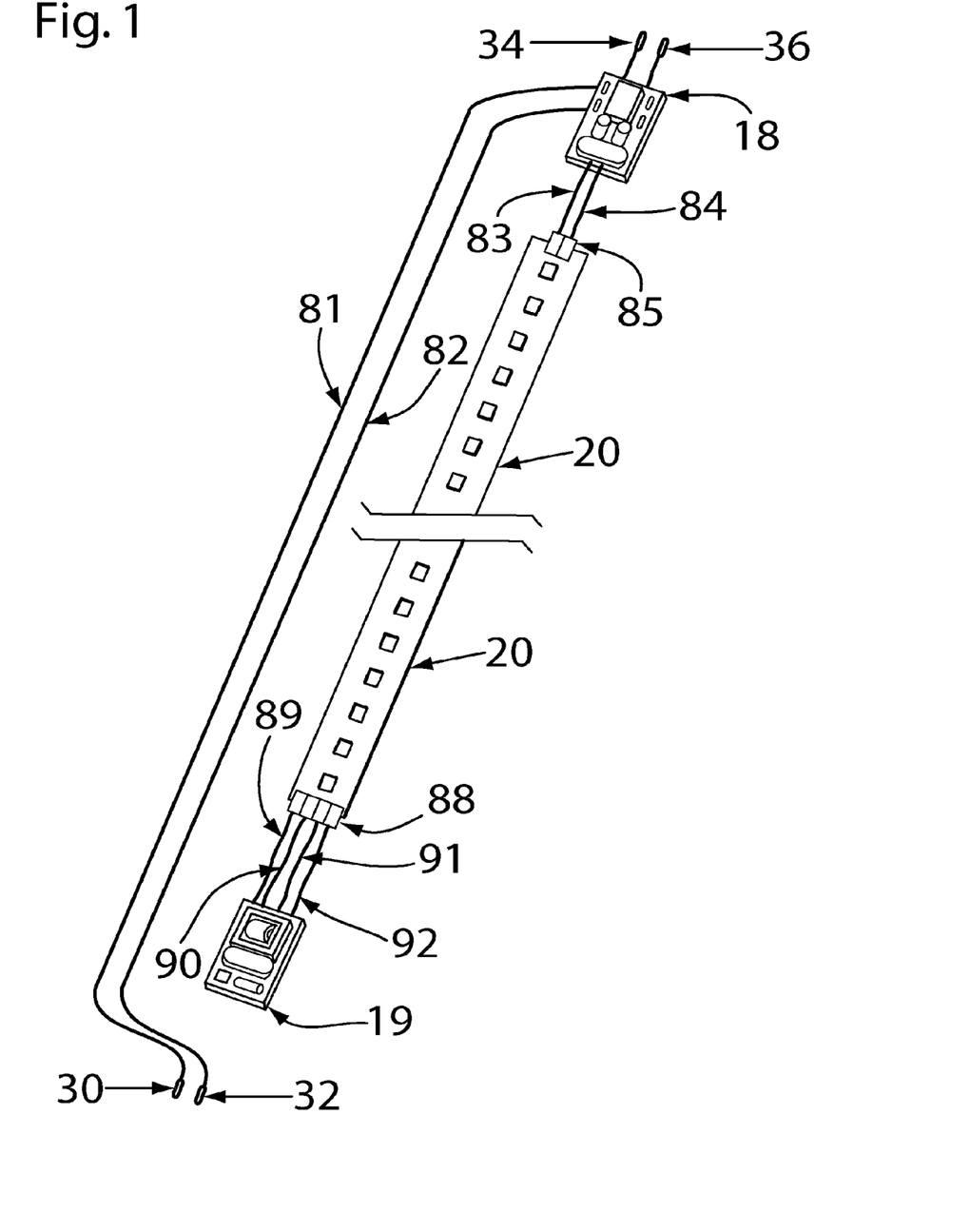
FIG. 1 shows an external perspective view of an LED driver circuit for fluorescent tube replacement, with its driver circuitry split onto two PCBs, with wiring for connecting the lamp's electrode pins to the driver circuitry PCB, and with an LED array.
Figure 2:
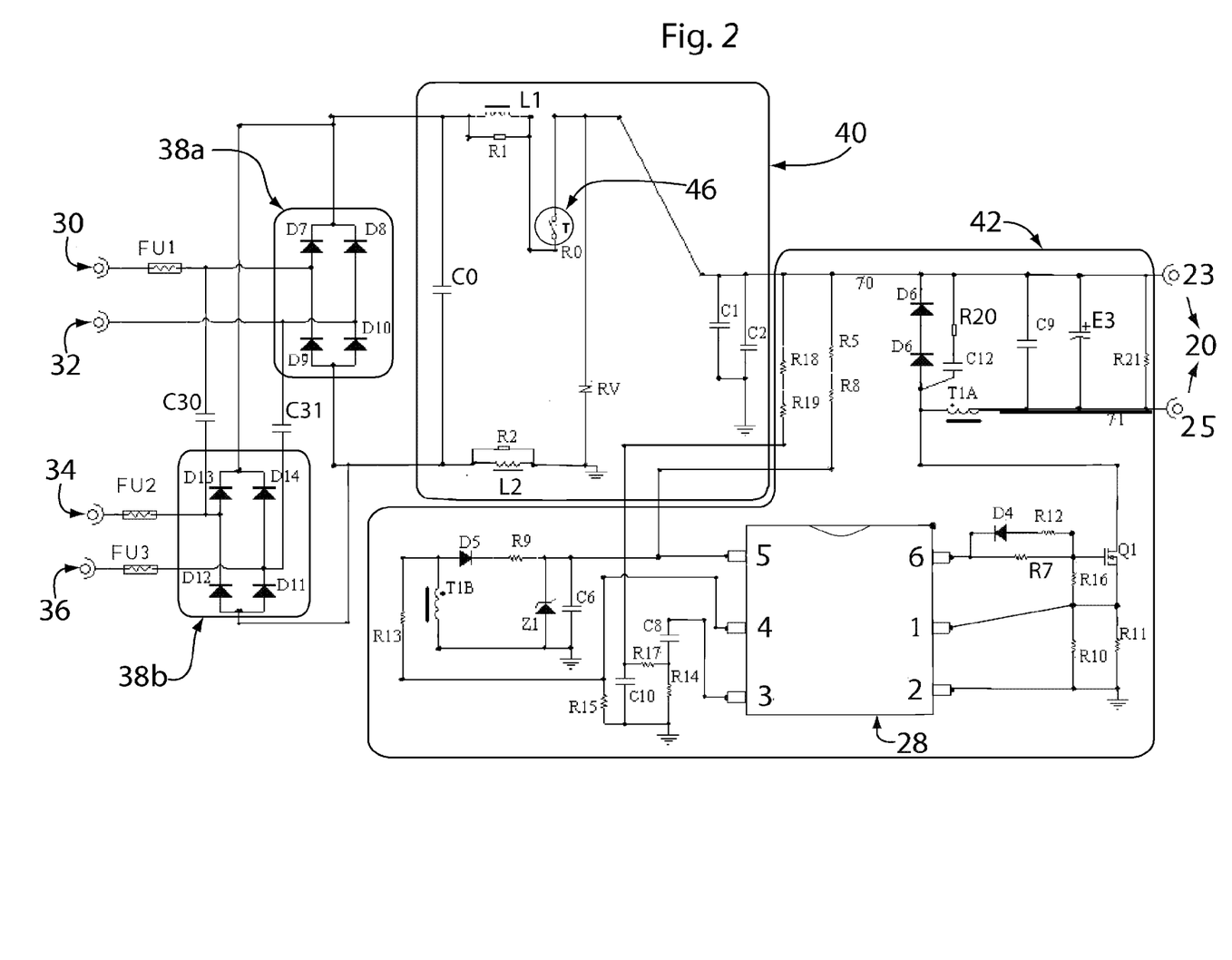
FIG. 2 shows an electronic schematic of the power management circuitry of the LED driver circuit for fluorescent tube replacement.

Referring to FIG. 1, the main sections of the driver circuitry are arranged on two separate PCBs. A rectifier circuit and a filter circuit are on a rectifier and filter circuit PCB 18 shown on the left, and a step-down constant current circuit is on PCB 19 shown on the right. To the rectifier and filter circuit PCB 18 are mounted various diodes, a varistor, capacitors, and conductors, all of which that are identified on the schematic of FIG. 2 described below. Again referring to FIG. 1, on the PCB 19 is mounted an integrated circuit (IC), a transistor, a DC to DC converter (transformer), flyback diodes, a electrolytic polarized capacitor, and conductors, all of which are also identified on schematic of FIG. 2 described below. Again referring to FIG. 1, long insulated wires 81 and 82 between the remote (lower right) pair of end cap electrode pins 30 and 32 and the rectifier and filter circuit PCB 18 will conduct, directly to the rectifier circuit, electrical current supply (if any) that may be input from either or both of the electrode pins 30 and 32 located adjacent to PCB 19. The other (upper right) end cap electrode pins 34 and 36 on PCB 18 are also wired directly to the (their adjacent) rectifier circuit (as also shown in FIG. 2 described below) and will conduct, directly to the rectifier circuit, electrical current supply (if any) that may be input from either or both of the electrode pins 34 and 36. The (possibly AC) power supply from any combination of (typically from only two of the pins simultaneously of) the four electrode pins 30, 32, 34, 36 is thus connected for processing through the rectifier circuit and the filter circuit mounted on PCB 18 into filtered DC before being passed to the step-down constant current circuit on PCB 19. The filtered DC output from PCB 18 is conducted via wires 83 and 84 through their 2-pin connector 85 on the LED array PCB on long conductors (not shown) layered within that PCB that terminate at two of the four pins at 4-pin connector 88. Wires 89 and 90 then conduct the PCB 18 output to the input side of the step-down constant current circuit on PCB 19. After the step-down constant current circuit processes the DC current as described below regarding FIG. 2, the processed DC current is output from the step-down constant current circuit to the LED array PCB on the other two wires 91 and 92 of the 4-pin connector 88.

FIG. 2 is an electronic schematic of the power management circuitry of the Fluorescent Compatible LED Tube Lamp 10 of FIGS. 1 and 2, showing how power can be supplied through either or both pairs of electrode pins, 30-32, or 34-36. Incoming AC power is rectified by parallel DC converter 38a and 38b, which then filtered by a filter circuit 40, and finally managed by a step-down constant current control circuit 40. The resulting current, at a required, appropriate voltage for the LED array is then allowed to reach the LED array via output pins 23 and 25, supplying the LED array 20 with power for illumination.

Rectifier Circuits

Following the schematic of FIG. 2 from the left, power would be supplied from external fluorescent fixtures to the first pair of electrode pins 30 and 32, to the second pair of electrode pins 34 and 36, or to a combination of pins of both pairs. The power, whether arriving at the electrodes as AC or DC is passed through the respective first rectifier circuit 38a and/or second rectifier circuit 38b. The purpose of the rectifier circuits is to convert AC supply, which periodically reverses direction, to direct current (DC), which flows in only one direction. The driver circuitry is configured to handle AC which is present at the sockets of a fluorescent fixture into which the Fluorescent Compatible LED Tube Lamp 10 is plugged, and convert it into DC current in order to operate the rest of the driver circuitry, which in turn supplies the LED array of the Fluorescent Compatible LED Tube Lamp 10. The driver circuitry is also configured to handle DC current directly from the sockets in case the fixture, into which Fluorescent Compatible LED Tube Lamp 10 may is inserted, has been previously re-wired for LED tube conversion and supplies DC current from its sockets.

Each rectifier circuit is protected by fuses. Power arriving and leaving via any particular subset of the four electrodes is fed through one or two of fuses FU1, FU2, FU3. Having one of the leads (in the schematic, the lead from electrode pin 32) without a fuse suffices as there must be at least one other electrode pin involved as a positive or negative electrode to complete the circuit of electrical current. Each of the first and second rectifier circuits 38a and 38b has four diodes, which each pass electrical current in only one direction. The first and second rectifier circuits are connected in parallel as shown. Any AC current arriving via electrode pins 30 and 32 is converted to DC by diodes D7 and D8 alternately. If AC current arrives via electrode pins 34 and 36 the current is converted to DC by diodes D13 and D14 alternately. Either way the converted DC current arrives at the input terminus of resistor R1 and inductor L1 of filter circuit 40. The electrode pins 34 and 30 are bridged with capacitor C30 and the electrode pins 32 and 36 are bridged with capacitor C31. The DC output (whether converted from AC or received as DC from any of the electrode pins 30, 32, 34, 36) of the first and second (paralleled) rectifier circuits is bridged with capacitor C0 to draw out high frequencies to the grounding branch of the filter circuit 40, with the positive side of the rectifier output being received at the positive input terminus of resistor R1 paralleled with inductor L1 of filter circuit 40, and the negative side of the DC output from the rectifier circuit being connected to the input terminus of resistor R2 paralleled with inductor L2 of filter circuit 40. The opposite terminus of R2 and L2 is grounded.

Either end of the Fluorescent Compatible LED Tube Lamp 10 can be plugged into either end of a fluorescent fixture having a tube to be replaced. The driver circuit is versatile in handling a variety of electrical current conditions present among various fluorescent lamp fixtures. It doesn't matter to the driver circuit shown in FIG. 2 whether the socket is shunted or Non-shunted. It also does not matter to the driver circuit shown in FIG. 2 whether any particular one of the various fluorescent lamp fixtures into which the Fluorescent Compatible LED Tube Lamp 10 might be plugged, has a ballast delivering modified AC current to the socket, whether there is bare line voltage (e.g. 110V AC) present at the socket, or whether there is an AC-DC transformer already wired into the fixture for a previous LED conversion. The arrangement of eight diodes D7 to D14 of the rectifier circuits 38a and 38b ensures that when power is input from any two of the electrode pins, four of the eight diodes will operate to pass DC current to the filter circuit 40, whether it is DC or AC power that is input from the electrode pins. The arrangement of eight diodes of the rectifier circuit, as shown in FIG. 2, allows that the electrode pins from which the input power is received can be any two of the tube's four electrode pins, that is, the input power can be from an electrode pin on one end of the tube in conjunction with another pin on the other end of the tube completing the input power circuit, or input power can be from an electrode pin on one end of the tube and with the other pin of the pair on the same end of the tube completing the input power circuit.

Filter Circuit

The driver circuit has a filter circuit 40 that protects against surge voltage. At the positive input side of filter circuit 40, the positive DC after being filtered through R1 and L2 in parallel is sent through a temperature-sensitive relay switch (RO) 46. If the circuitry including the temperature-sensitive relay switch 46 becomes too hot, it opens, the driver circuit is broken and the Fluorescent Compatible LED Tube Lamp 10 would turn off for safety reasons. When temperature-sensitive relay switch 46 is again in a safe temperature range, it closes, and the DC current proceeds to be filtered by the filter circuit 40. The filter circuit has a varistor RV that connects the output of the temperature-sensitive relay switch 46 to ground. Capacitor C1 is wired in parallel with varistor RV to ground. A varistor is an electronic component with diode-like but nonlinear current-voltage characteristics. At low voltage it has high resistance to current, and at high voltage it changes and becomes low resistance to current. The varistor is thus a voltage-dependent variable resistor. The varistor RV is used to protect the circuit against excessive transient voltages by inserting it as shown so that, when triggered, it will shunt to ground voltage and current levels that would otherwise be harmful to the sensitive components of the step-down constant current circuit 42 shown in FIG. 2 and described below.

Step-Down Constant Current Circuit

After the useful DC current makes its way through the filter circuit 40, it is directed to a step-down constant current circuit 42. The positive DC output lead 70 goes directly to the positive DC output pin 23. The other branches from the positive DC output lead 70 conduct current away from positive DC output lead 70 through a number of paths that together have the effect of adjusting the DC voltage and stabilizing the DC current drawn by the LED array across positive DC output pin 23 and negative DC output pin 25.

The IC 28 drives the step-down constant current circuit, keeping it in constant on time operation to achieve low switching losses and a high power efficiency. The step-down constant current circuit performs switching, that is, turn-on of the transistor Q1, when the voltage to it is at or near a minimum, that is, when a valley in the voltage value is detected. The valley turn-on of the transistor Q1 minimizes the hard switching effect that would occur at higher voltages and cause extra heat as well as electromagnetic interference. Valley switching is also known a quasi-resonant switching mode. The IC 28 works with, for example, a 0.3V current sense reference voltage which leads to a low sense resistance and a low conduction loss of energy from the current to heat ((which should be dissipated away from the LED array). Current as low as 15 μA can start the IC driver, which then operates with current sourcing in a useful range of 1A sourcing and 2A sinking A 6-pin IC 28 suffices. As shown in the schematic of FIG. 2, a sense resistor R11 is connected across current sense (ISEN) pin 1 and the ground (GND) pin 2. A resistor-capacitor circuit (RC circuit or RC filter or RC network) of resistors and capacitors driven by the voltage or current source as shown is connected across loop compensation (COMP) pin 3 and (GND) pin 2 (via the two ground points for those respective pins). An inductor current zero-crossing detection pin 4 receives voltage from a resistor divider (R13 and R15) as shown and detects an inductor current zero cross point, providing both voltage protection and line regulation. If the voltage on the inductor current zero-crossing detection (ZCS) pin 4 rises above a programmed value, the IC 28 enters a voltage protection mode. Line regulation can be adjusted by changing the upper resistor R13 of the resistor divider. Power supply (VIN) pin 5 receives power to the IC 28 via resistors R5 and R8 and also provides output over-voltage protection in conjunction with the loop comprising diode D5, resistor R9, Zener diode Z1, and the B side of transformer T1, on the loop also comprising resistor R13 to the inductor current zero-crossing detection pin 4. The Zener diode allows current to flow in the forward direction in the same manner as a simple diode, but also permits it to flow in the reverse direction when the voltage is above a certain value (known as the breakdown voltage). The transformer T1 operates as a DC to DC converter that can produce different output voltages depending on input voltages. The step-down constant current converter generally reduces (steps down) the input DC voltage to an output DC voltage selected for the desired current flow to the LEDs, but with appropriate values of for components is capable of a range from an output voltage much larger than the input voltage, down to an output voltage of almost zero. See the value table farther below for an example of component selection.

The gate drive (DRV) pin 6 is connected to the gate of the transistor Q1 via resistor R7, with feedback current drawn from the sense pin 1 to ground pin 2 R10/R11 loops also being fed to R7. The transistor Q1 is preferably a metal-oxide-semiconductor field-effect transistor (MOSFET), a four-terminal device that has source (S), gate (G), drain (D), and body (B) terminals available, but with the S and B terminals short-circuited internally, making it a three-terminal device as shown in the schematic like other field-effect transistors. The current output from Q1 drives the remaining components of step-down constant current circuit 42. The diode D4 receiving feedback current through R12 and having R16 and R10 assists Q1 to receive its on or off DC supply signal at consistent levels from DRV pin 6 and makes transistor Q1 turn off very soon after DRV pin 6 drops its output to an "off" condition.

Valley turn-on of Q1, a MOSFET, known as quasi-resonant switching, is termed "valley" because it is done at a low point in drain voltage. Each switching cycle of control by the integrated circuit (IC) 28 consists of tracking a current rising, current falling, and a switching-on time. The start-up current of the IC 28 is very low, and standby power loss is kept correspondingly low. The switching frequency of the step-down constant current circuit can be limited to, for example, 200 kHz by programming the IC, which limits switching losses and improves EMI performance during light load conditions for this sub-circuit. The IC also monitors for short circuit conditions in the output to the LED array and protects the device by shutting down current supply via Q1 accordingly.

Q1 feeds its current output via the two diodes D6 in parallel with the series of capacitor C12 and resistor R20 to join the positive DC output lead 70 from the filter circuit 40. On the other hand the positive current output from Q1 provides the required output for the LED array via the A-side of DC to DC transformer T1 to the negative DC lead 71. An electrolytic capacitor will achieve a larger capacitance per unit volume than other types of capacitors. The polarized aspect of capacitor E3 requires its marked positive side must be joined to the positive DC output lead (if it were wired the opposite way, its electro-chemical reaction would work in reverse, eating away at the thin insulating layer inside the capacitor and leading to a short between the two pins). A final current stabilizing component for the step-down constant current circuit 42 is R21 which bridges the positive DC output lead 70 to the negative DC output lead 71. R21 has high resistance but allows some low current flow from the positive DC output lead 70 to the negative DC output lead 71. The potential drop in voltage in absolute magnitude between that at positive output pin 23 and that at negative output pin 25 provides the voltage required by the LED array to draw the appropriate flow of electrical current for its rating and the resulting level of illumination. The two diodes D6 in series, wired in parallel with the series C12, R20 are free-wheeling (or flyback) diodes, and work in combination with the inductance of the rest of the final output circuitry T1 A, C9, E3 and R21. The transistor Q1 feeds its current output via the two flyback diodes D6 in series, wired in parallel with a series of a flyback capacitor C9 and a flyback resistor R21 to join the positive DC output lead, and also feeds its current output to an A-side input of the DC to DC transformer having its A-side output connected to a negative output lead for the LED light source. The A-side output of the DC to DC transformer is also connected to the output pin capacitor C9, the polarized electrolytic capacitor E3, and an LED output bridging resistor R21. Each of the output pin capacitor C9, the polarized electrolytic capacitor E3, and the LED output bridging resistor R21 are bridged in parallel across the negative lead 71 and its negative output pin 25 to the positive output pin 23 in order to stabilize output current for the LED light source at a voltage appropriate for the LED array, to provide a smooth current for the load of the LED array 20 to which output leads 23 and 25 are connected.

To summarize, when the electrode pins 30, 32, 34, and/or 36 are fed either AC supply or DC supply, either or both of the first rectifier circuit 38*a* and the second rectifier circuit 38*b* convert the AC or DC supply to DC. The DC current is then filtered of unwanted high voltage in filter circuit 40. The power from AC input to DC (or from direct input DC from the electrode pins) as filtered by the filter circuit is then converted by the step-down constant current circuit 42 into output current at a desired level for the selected LED array.

When the lighting fixture for the replacement tube is switched off with a remote pre-existing switch (typically a hand-operated wall-mounted switch), the voltage arriving at the IC 28 will drop to a level at which the IC will shut off. Capacitors (C0 to C31) are used throughout the drive circuit to store electricity and provide a smooth shutdown of the system as they discharge upon electrical supply to the driver being shut off. A like shutdown will occur if the output voltage spikes to a large transient value that exceeds a programmed maximum, whether due to a null load or otherwise, as the IC 28 will be triggered into over-voltage protection and will discharge the output voltage to ground. To protect against an exceedingly large spike, a varistor RV is used in the filter circuit 40. If a short-circuit is detected by the IC 28, it drops the output voltage of the step-down constant current circuit to 0. The IC's own power can be made to concomitantly shut off by having the voltage powering the IC proportional to its output via auxiliary winding. If the cause of the over-voltage or short-circuit is removed, the system will self-start again automatically with the valley turn-on from within-range AC or DC input to the rectifier circuits 38*a* and 38*b*.

Once started via valley-turn of the MOSFET Q1 by the IC 28, the step-down constant current circuit 42 operates in a constant ON time mode, that is, the ON time determined by the IC increases with the input AC (or DC) to the rectifiers increasing to a minimum preselected level, up to a maximum preset ON time for output current when a full load for device is reached. However, when the input voltage for the step-down constant current circuit 42 reaches a preselected maximum, OFF time for the output current is dictated by the IC. The ON and OFF determinations are made to reduce switching frequency, with benefits of less heat to be dissipated, less EMI, and less strain on the electronic components. However, the electronic components are preferably solid state and would last a very long time in any event in most typical ambient conditions.

Layout

To reduce heat buildup that could be to the detriment of components, and concomitantly to reduce consumption of energy that is not transformed into light energy by the LEDs, and finally to avoid or minimize unwanted resistance effects from conductors themselves, the length of the conducting loops of the driver should be minimized. It is particularly effective in this regard to keep the conductor loop from the source pin to the current sample resistor to the GND pin 2 as short as is feasible. Likewise the resistor divider network connected to the inductor current zero-crossing detection pin 4 should be looped adjacent to the IC 28.

In contrast and in keeping with general electronic principles to avoid interference effects, it is best to insulate or keep separate the control circuit from the power circuit loop—this too can be done within the spatial constraints of the overall device. In a preferred embodiment, the first rectifier block and the second rectifier block 38b are physically located in one end cap, adjacent the power supply input electrode pins for one rectifier circuit, with tube-length wires connecting the other rectifier circuit to its (remote) input pins mounted on the opposite end cap. The filter circuit 40 can likewise be mounted with the rectifier circuits in their end cap. Wires running the length of the tube then connect these circuits in one end cap to the rest of the driver circuit, including the step-down constant current circuit 42 which contains low-voltage, sensitive electronic components such as the IC 28, is physically located in the opposite end cap away from the rectifier circuitry.

The driver circuit as presented in the schematic and with sample values for the components such as given below, results in circuitry that can be fitted into the end caps for the tube, the end caps being no larger than will fit into standard fluorescent tube fixtures with sockets to receive the electrode pins. The driver circuitry need not extend into the translucent tube into which the LED array is mounted, except for connecting wires to connect sections of the driver circuitry mounted in opposite end caps of the tube to each other.

EXAMPLES

A preferred implementation of the Fluorescent Compatible LED Tube Lamp will now be described in detail—an T8 fluorescent tube replacement with an 18 Watt LED array, putting out 140 lumens per watt (which is more power efficient than the T8 fluorescent tube being replaced) in which an array of 120 LEDs (HL-A-2835H431W-S1-08-HR3_3000 k_R80_0.2 W_3.3V_RO) would be driven with the following component Ids/sources/values for the electronic parts of the driver circuit disclosed on FIG. 2:

FU1-FU3 2A_350V_3.6*10 mm_RO
RV 10D561_10_7.5 mm RO
C0 CL21_630V_100 nF_10%_10 mm_RO
C1 CL21_630V_100 nF_10%_10 mm_RO (C2 omitted for 18 Watt version)
L1 2.0 mH_Φ0.15_Φ6*8_RO
L2 2.0 mH_Φ0.15_Φ6*8_RO
E3 80V_82 UF_105° C._20%_10*16 mm_10000 h_RO
RO 80_5%_15*7.3*3.9 mm_RO
Q1 COOL MOS_5N70_T0-251_700V_5A_0.9Ω_150°_RO
T1 Ferrite core, magnet wire 2UEW 0.2, dual inductor coils with 2 Ts mylar layer tape CT-280 (L-16HD-T08A1-V1.0-EFD15_RO from Jinhu Electronics Co., Ltd Jimei, Xiamen, China)
IC IC_SO-6_SY5824A_150°_RO (Silergy Corp., A1501, Technology Mansion, Eastern Software Park, No. 90 Wensan Road, Hangzhou, Zhejiang, China)
R1 0805_1KΩ_5%_RO
R2 0805_1KΩ_5%_RO
R5 1206_330KΩ_5%_RO
R7 0805_100Ω_5%_RO
R8 1206_330KΩ_5%_RO
R9 0805_100Ω_5%_RO
R10 1206_0.75Ω_1%_RO
R11 1206_6.8Ω_1%_RO
R12 0805_10Ω_5%_RO
R13 0805_120KΩ_5%_RO
R14 0805_1KΩ_5%_RO
R15 0805_10KΩ_5%_RO
R16 0805_10KΩ_5%_RO
R17 0805_7.5KΩ_5%_RO
R18 1206_220KΩ_5%_RO
R19 1206_220KΩ_5%_RO
R20 0805_68Ω_5%_RO
R21 1206_100KΩ_5%_RO
C6 1206_25V_1 uF_10%_X7R_RO
C8 0805_25V_1 uF_10%_X7R_RO
C9 1206_100V_10 nF_10%_X7R_RO
C10 0805_25V_1 uF_10%_X7R_RO
C12 1206_1000V_68 pF_5%_NPO_RO
C30 1206_1000V_470 pF_5%_NPO_RO
C31 1206_1000V_470 pF_5%_NPO_RO
Z1 SOD-123_16V_0.5 W_150°_RO
D4 1N4148W_SOD-123_75V_150 mA_150°_RO
D5 E1D_SOD-123FL_200V_1A_35 nS_150°_RO
D6 ES2J_SMB_600V_2A_35 nS_150°_RO
D7-D14 US1M_SMA_1000V_1A_75 nS_150°_RO.

Another preferred implementation is a T8 fluorescent tube replacement with a 10 Watt LED array, putting out 140 lumens per watt (which is more power efficient than a T8 fluorescent tube) having an array of 60 LEDs (HL-A-2835H431W-S1-08-HR3_3000k_R80_0.2 W_3.3V_RO—the only change in the LEDs used being the "color" or hot/cool range value of 3000K rather than 4000K example given above for the 18 Watt version—the particular range selected for the LEDs does not affect the values appropriate for the driver circuit), in which the LED array would be driven with the above component values for the electronic parts of the circuit disclosed on FIG. 2, except for the following changes:

C1 would be paralleled with a C2 CL21_630V_150 nF_10%_10 mm_8.1 mmRO
E3 (the polarized electrolytic capacitor) would be changed to
80V_56UF_105° C._20%_10*16 mm_10000h_RO.
There is no R10 (1206_0.75Ω_1%_RO in the 18W example) but R11 would be changed to 1206_1.08Ω_1%_RO to accommodate the lower wattage rating of the LEDs. Other wattage examples would have corresponding changes to the above-noted components to a like fit and working effect.

Figure 3:
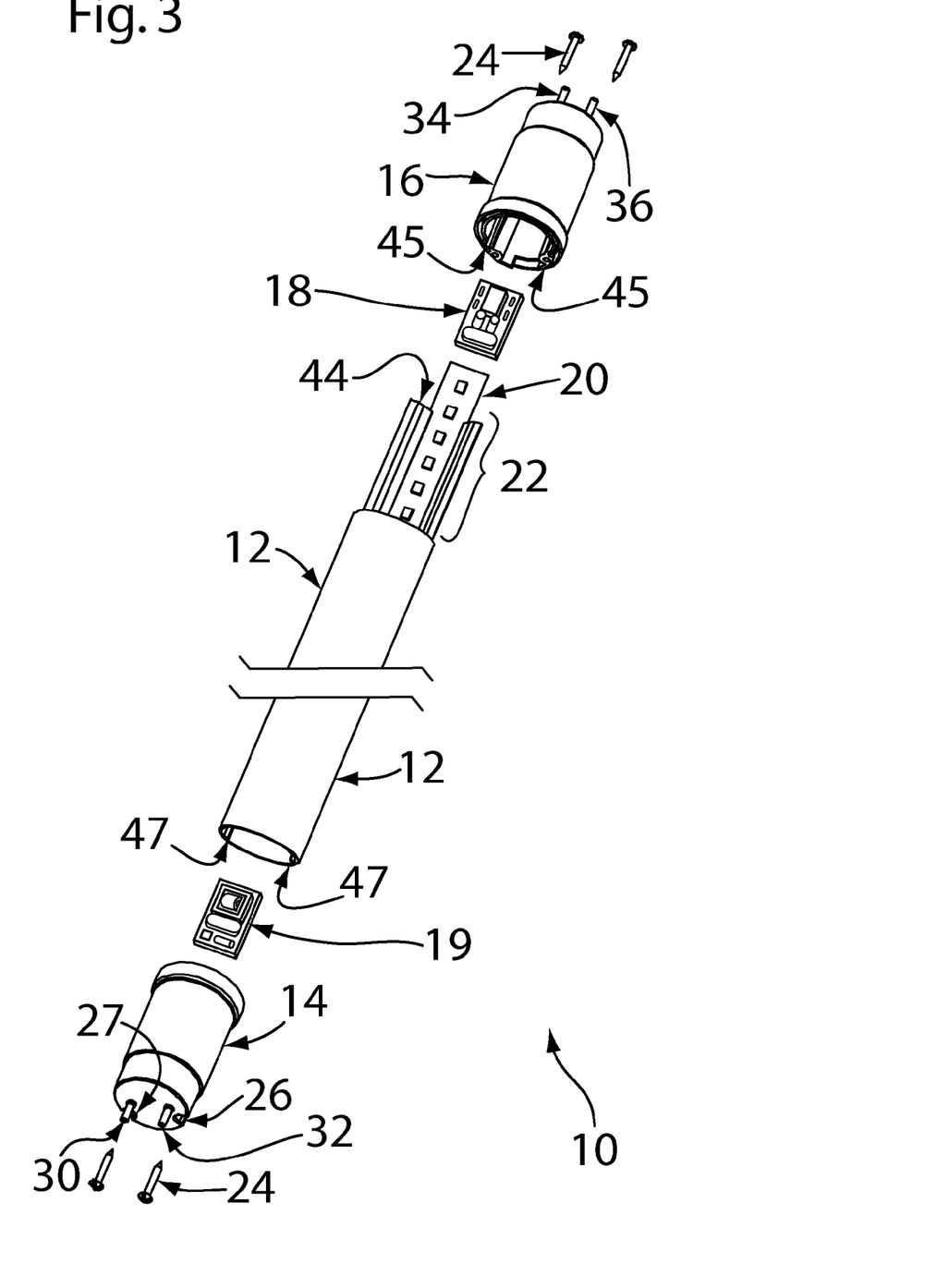
FIG. 3 shows an exploded isometric view of external and internal elements of the LED driver circuit for fluorescent tube replacement together with a tube to hold its LED array.

FIG. 3 shows an exploded isometric view of external and internal elements of the invention including a fluorescent compatible LED tube lamp 10. In addition to elements listed previously, housing bolts 24 are shown which are inserted into holes 26 and 27 to secure the PCB housings (14 & 16) to threaded holes in each end of the LED holder 22. The rectifier and filter printed circuit board (PCB) 18 and the step-down constant current PCB 19 are each to be enclosed by a PCB Housing (14 or 16). The rectifier portion of the driver circuit is on PCB 18 and would receives power from any two (or more) individual electrode pins from among the first pair of electrode pins 30 and 32 at one end of the fluorescent compatible led tube lamp 10 and the second pair of electrode pins 34 and 36 at the other end of the fluorescent compatible LED tube lamp 10 (via the wiring shown in FIG. 1). One pair of the electrode pins is connected (through a fuse or fuses as indicated in FIG. 2) directly to the rectifier circuit. The other two electrode pins located at the other end of the tube 10 are also connected to the rectifier but with wires (81 and 82 in FIG. 1) that would run the length of the inside of the tube 10, behind the LED array (so as not to obscure the light emitted). The rectifier passes DC if it is input from the pins, and converts AC to DC when AC is input from any of the electrode pins. In a preferred embodiment, the filter circuit of the driver circuitry is mounted adjacent to the rectifier circuit on PCB 18. The DC output of the rectifier circuit may thus be passed to the filter circuit by conductors PCB 18. Referring back to FIG. 1 again, the output of the filter circuit is however to be passed from PCB 18 by a pair of wires that fit into a 2-pin wire connector and thereby make contact with a pair of conductors on the LED array PCB that run its length to 2 terminals of a 4-pin connector at the other end of the LED array PCB. The filter circuit's DC power output is thereby passed to the step-down constant current circuit of the driver circuitry by 2 of the 4 wires that connect of the step-down constant current circuit to the 4-pin connector of the LED array PCB. The filtered DC power is modified by the step-down constant current circuit of the driver circuitry to supply DC power at a voltage and current level that will drive the LED array 20 to illuminate in accordance with its capabilities. The other two of the 4 wires that connect of the step-down constant current circuit to the 4-pin connector of the LED array PCB are output wires for the constant DC thereby created to arrive at the LED array. Referring again to FIG. 3, the LED array 20 is supported inside the tube 12 by means of the LED holder 22 with ridges 44 for longitudinal strength. The LED holder can be made of plastic or alternatively of metal in which case the ridges 44 function as cooling fins to help dissipate heat away from individual LED's in the LED array 20. The channels 45 inside tube end 16 (and like channels in the other tube end) receive and hold flanged LED array holder 22 with its ridges 44.

Figure 4:
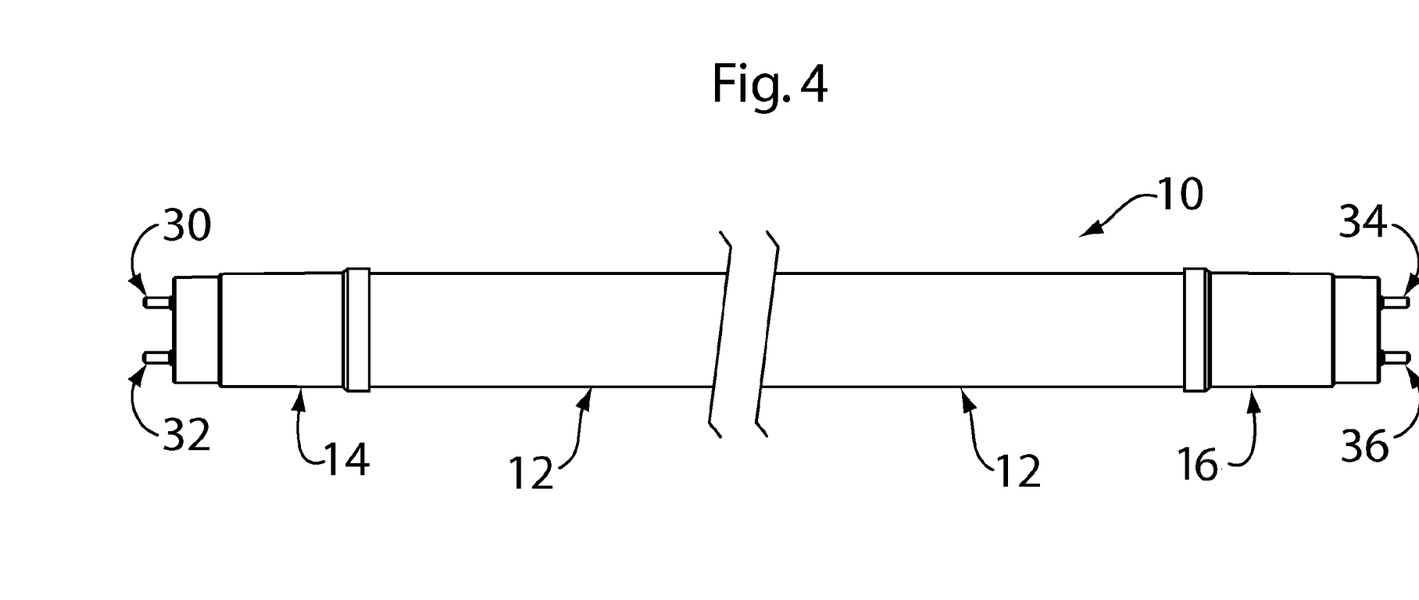
FIG. 4 shows a side view of a fluorescent compatible LED tube lamp assembled with the LED driver circuit and a transparent tube to hold its LED array.

FIG. 4 shows a side view of an assembled fluorescent compatible LED tube lamp 10 (containing an LED array and the LED driver circuitry of the present invention) comprising of a cylindrical translucent or transparent tube 12, enclosed at the left end by a left PCB housing 14 with a first pair of electrode pin 30 and 32 and on the right end by a right PCB housing 16 with a second pair of electrode pins 34 and 36. The PCB housings function as end caps for the tube 12. Each pair of electrode pins is sized to seat into existing fluorescent tube fixture sockets.

As can be seen from the Figures and the foregoing description, the LED driver circuit for fluorescent tube replacement of the present invention can be summarized as:

a) a tube for enclosing an LED light source, the tube having a first end cap and a second end cap, each of the first and second end caps having a pair of electrode pins;

b) each of the pairs of electrode pins being wired to a respective first rectifier circuit and a second rectifier circuit;

c) each of the first rectifier circuit and the second rectifier circuit having a pair of input diodes, each input diode having an input side that is wired to one of the electrode pins;

d) a first input capacitor connecting a first electrode pin connected to a first input diode in the first rectifier circuit to a first electrode pin connected to a first input diode in the second rectifier circuit, and a second input capacitor connecting a second electrode pin connected to a second input diode in the first rectifier circuit to a second electrode pin connection to a second input diode in the second rectifier circuit;

e) each input diode having an output lead, the output leads being connected to provide a combined DC output from the first rectifier circuit and the second rectifier circuit.

in which DC output from the rectifier circuit is conducted to filter circuit that filters to ground unwanted frequencies of electrical current and filters to ground harmful surges in voltage and in which filter circuit output is conducted to a step-down constant current circuit that converts the DC output from the rectifier circuit into constant DC output for driving the LED light source.

The LED lamp tube and driver circuit with the electronic parts values specified in the examples above would be a direct replacement for T8 fluorescent tubes in lamp systems with or without ballasts. With a different diameter and electrode pin gap the LED lamp tube would also fit in sockets designed for other kinds of fluorescent tubes, and with different values for the parts in the driver circuit to handle different electrical supply values, the LED lamp tube and driver circuit would be a direct replacement for other fluorescent tubes in other lamp systems, regardless of whether those systems had ballasts present or previously removed.

The LED Tube Driver Circuitry for Ballast and Non-ballast Fluorescent Tube Replacement allows direct replacement of fluorescent tubes while using available power from ballasted or non-ballasted fixtures, as well as shunted or non-shunted sockets. The invention is a self-ballasted LED array replacement device for previously installed, formerly fluorescent tube fixtures.

The foregoing description of the preferred apparatus and method of installation and use should be considered as illustrative only, and not limiting. Other forming techniques and other materials may be employed towards similar ends. Various changes and modifications will occur to those skilled in the art, without departing from the true scope of the invention as defined in the above disclosure, and the following general claims.

I claim:

1. An LED driver circuit for fluorescent tube replacement comprising:

a) a tube for enclosing an LED light source, the tube having a first end cap and a second end cap, each of the first and second end caps having respectively a first pair of electrode pins and a second pair of electrode pins;

b) a rectifier circuit comprising a first rectifier sub-circuit connected to the first pair of electrode pins and a second rectifier sub-circuit connected to the second pair of the electrode pins, each rectifier circuit having at least a first input diode and a second input diode, each of the input diodes having an input lead connected to one of the electrode pins, and the input diodes having output leads that are connected to provide DC output from the rectifier circuit;

in which DC output from the rectifier circuit is conducted to a constant current circuit that converts the DC output from the rectifier circuit into constant DC output for driving the LED light source.

2. The LED driver circuit for fluorescent tube replacement of claim 1, in which the DC output from the rectifier circuit is conducted to the constant current circuit via a filter circuit that filters out surge voltage from the DC output from the rectifier circuit.

3. The LED driver circuit for fluorescent tube replacement of claim 1, in which each of the first and second rectifier sub-circuits has a pair of additional diodes, each pair of additional diodes being looped in parallel with a capacitor connected to the DC output from the rectifier circuit, to provide a stabilizing flyback loop from the DC output of the rectifier circuit back to the input leads of the input diodes.

4. The LED driver circuit for fluorescent tube replacement of claim 1, in which at least three of the input leads each have a fuse in series between the input lead and the input lead's-respective input diode.

5. The LED driver circuit for fluorescent tube replacement of claim 2, in which the filter circuit comprises a combination of a resistor and an inductor in parallel, the combination being in series with the DC output of the rectifier circuit to filter out unwanted current frequencies of the DC output.

6. The LED driver circuit for fluorescent tube replacement of claim 2, in which the filter circuit comprises a temperature-sensitive relay switch that opens if the filter circuit exceeds a safe temperature range for the driver circuit.

7. The LED driver circuit for fluorescent tube replacement of claim 2, in which the filter circuit comprises a varistor that grounds excessive voltage spikes in the DC current from the rectifier circuit.

8. The LED driver circuit for fluorescent tube replacement of claim 5, in which the filter circuit comprises a combination of a resistor and an inductor in parallel, the combination being in series with a capacitor in series with the DC output of the rectifier circuit to filter out unwanted current frequencies of the DC output to ground.

9. The LED driver circuit for fluorescent tube replacement of claim 2, in which the filter circuit comprises at least one capacitor in series with DC output from the rectifier circuit to ground.

10. The LED driver circuit for fluorescent tube replacement of claim 1, in which the constant current circuit is a step-down constant current circuit that converts the DC output from the rectifier circuit to DC suitable for driving the LED light source.

11. The LED driver circuit for fluorescent tube replacement of claim 1, further comprising the LED light source, in which the LED light source is an array of LEDs mounted within the tube, the array receiving DC suitable for driving the LED light source from the constant current circuit.

12. The LED driver circuit for fluorescent tube replacement of claim 1, in which the rectifier circuit is on a first printed circuit board (PCB) located in the first end cap and the constant current circuit is on a second printed circuit board (PCB) located in the second end cap, with two conductor wires running the length of the tube to connect a first pair of electrode pins on the second end cap to their respective input diodes in the rectifier circuit and two short conductors connecting a second pair of electrode pins on the first end cap to their respective input diodes in the rectifier circuit.

13. The LED driver circuit for fluorescent tube replacement of claim 1, in which current output from the rectifier circuit via two rectifier output wires connected to a first 2-pin connector connected at a first end of an LED array board to two conductors to a second 2-pin connector at an opposite end of the LED array board, second 2-pin connector being connected to an input side of the constant current circuit, and an output side of the constant current circuit being connected by a third 2-pin connection to a positive terminal and a negative terminal for electrical supply to the LED array board.

14. The LED driver circuit for fluorescent tube replacement of claim 10, in which the step-down constant current circuit comprises a positive DC output lead to a positive DC output pin and branch circuits that adjust DC voltage and stabilize DC current for the LED light source across the DC output pin and a negative DC output pin.

15. The LED driver circuit for fluorescent tube replacement of claim 14, comprising an integrated circuit (IC) that drives the step-down constant current circuit, keeping the step-down constant current circuit in constant on time operation to achieve low switching losses and a high power efficiency.

16. The LED driver circuit for fluorescent tube replacement of claim 15, further comprising a transistor and in which the step-down constant current circuit performs switching to turn output from the transistor on when the transistor's input voltage is low.

17. The LED driver circuit for fluorescent tube replacement of claim 15, in which the integrated circuit (IC) has a current sense pin, a ground pin, a loop compensation pin, an inductor current zero-crossing pin, a power supply pin, and a gate drive pin.

18. The LED driver circuit for fluorescent tube replacement of claim 17, in which a sense resistor is connected across the current sense pin to the ground pin, a resistor-capacitor network driven by the DC output from the rectifier circuit is connected across the loop compensation pin and the ground pin, the inductor current zero-crossing detection pin receives voltage from a resistor divider, the power supply pin receives power for the integrated circuit (IC) from resistors in series with the DC output from the rectifier circuit.

19. The LED driver circuit for fluorescent tube replacement of claim 18, in which the integrated circuit (IC) provides output over-voltage protection and line regulation in conjunction with a loop comprising a diode, a resistor a Zener diode, and a B-side of a DC to DC transformer, on a loop that comprises a resistor to the inductor current zero-crossing detection pin.

20. The LED driver circuit for fluorescent tube replacement of claim 19, in which the gate drive pin is connected to a gate of the transistor via a transistor loop resistor, with feedback current drawn from the sense pin to a ground pin resistor loops also being fed to the transistor loop resistor.

21. The LED driver circuit for fluorescent tube replacement of claim 20, in which a transistor feedback diode receives feedback current from the transistor through a transistor feedback resistor connected by at least one ground resistor to ground in order to assist the transistor to receive a DC supply from the drive pin at consistent levels and to enable the transistor to turn off quickly upon the integrated circuit (IC) dropping the DC supply from the drive pin.

22. The LED driver circuit for fluorescent tube replacement of claim 19, in which the transistor feeds the transistor's current output via two flyback diodes in series, wired in parallel with a series of a flyback capacitor and a flyback resistor to join the positive DC output lead, and also feeds the transistor's current output to an A-side input of the DC to DC transformer having an A-side output connected to a negative output lead for the LED light source.

23. The LED driver circuit for fluorescent tube replacement of claim 22, in which the A-side output of the DC to DC transformer is also connected to an output pin capacitor, a polarized electrolytic capacitor, and an LED output bridging resistor, each of the output pin capacitor, a polarized electrolytic capacitor, and an LED output bridging resistor being bridged in parallel to the positive output pin in order to stabilize output current for the LED light source at a voltage appropriate for the LED array.

24. An LED driver circuit for fluorescent tube replacement comprising:
   a) a tube for enclosing an LED light source, the tube having a first end cap and a second end cap, each of the first and second end caps having a pair of electrode pins;
   b) each of the pairs of electrode pins being wired to a respective first rectifier circuit and a second rectifier circuit;
   c) each of the first rectifier circuit and the second rectifier circuit having a pair of input diodes, each input diode having an input side that is wired to one of the electrode pins;
   d) a first input capacitor connecting a first electrode pin connected to a first input diode in the first rectifier circuit to a first electrode pin connected to a first input diode in the second rectifier circuit, and a second input capacitor connecting a second electrode pin connected to a second input diode in the first rectifier circuit to a second electrode pin connection to a second input diode in the second rectifier circuit;
   e) each input diode having an output lead, the output leads being connected to provide a combined DC output from the first rectifier circuit and the second rectifier circuit;
   in which DC output from the rectifier circuit is conducted to filter circuit that filters to ground unwanted frequencies of electrical current and filters to ground harmful surges in voltage and in which tilter circuit output is conducted to a step-down constant current circuit that converts the DC output FROM the rectifier circuit into constant DC output for driving the LED light source.

25. The LED driver circuit for fluorescent tube replacement of claim 24, in which the step-down constant current circuit operates with ON time determined by an integrated circuit (IC) that increases with current to the rectifier circuit increasing to a minimum preselected level, up to a maximum preset ON time for output current when a full load for the LED light source is reached, at which time OFF time for the output current is dictated by the integrated circuit (IC).

26. The LED driver circuit for fluorescent tube replacement of claim 2, in which:
   a) the rectifier circuit has two pairs of additional diodes, each pair of additional diodes being looped in parallel with a capacitor connected to the DC output from the rectifier circuit, to provide a stabilizing flyback loop from the DC output of the rectifier circuit back to the input leads of the input diodes;
   b) at least three of the input leads each have a fuse in series between the input lead and the input lead's respective input diode;
   c) the filter circuit comprises a combination of a resistor and an inductor in parallel, the combination being in series with the DC output of the rectifier circuit to filter out unwanted current frequencies of the DC output;
   d) the filter circuit comprises a temperature-sensitive relay switch that opens if the filter circuit exceeds a safe temperature range for the driver circuit;
   e) the filter circuit comprises a varistor that grounds excessive voltage spikes in the DC current from the rectifier circuit;
   f) the filter circuit comprises a combination of a resistor and an inductor in parallel, the combination being in series with a capacitor in series with the DC output of the rectifier circuit to filter out unwanted current frequencies of the DC output to ground;
   g) the filter circuit comprises at least one capacitor in series with DC output from the rectifier circuit to ground.

27. The LED driver circuit for fluorescent tube replacement of claim 2, in which:
   a) the constant current circuit is a step-down constant current circuit that converts the DC output from the rectifier circuit to DC suitable for driving the LED light source;
   b) an LED light source which is an array of LEDs mounted within the tube, the array receiving DC suitable for driving the LED light source from the constant current circuit;
   c) the step-down constant current circuit comprises a positive DC output lead to a positive DC output pin and branch circuits that adjust DC voltage and stabilize DC current for the LED light source across the DC output pin and a negative DC output pin;
   d) an integrated circuit (IC) drives the step-down constant current, keeping the step-down constant current circuit in constant on-time operation to achieve low switching losses and a high power efficiency;
   e) a transistor, the step-down constant current circuit performing switching to turn on output from the transistor when the transistor's input voltage is low.

28. The LED driver circuit for fluorescent tube replacement of claim 27, in which:
   a) the integrated circuit (IC) has a current sense pin, a ground pin, a loop compensation pin, an inductor current zero-crossing pin, a power supply pin, and a gate drive pin;
   b) a sense resistor is connected across the current sense pin to the ground pin, a resistor-capacitor network driven by the DC output from the rectifier circuit is connected across the loop compensation pin and the ground pin, the inductor current zero-crossing detection pin receives voltage from a resistor divider, the power supply pin receives power for the integrated circuit (IC) from resistors in series with the DC output from the rectifier circuit;
   c) the integrated circuit (IC) provides output over-voltage protection and line regulation in conjunction with a loop comprising a diode, a resistor a Zener diode, and a B-side of a DC to DC transformer, on a loop that comprises a resistor to the inductor current zero-crossing detection pin;
   d) the gate drive pin is connected to a gate of the transistor via a transistor loop resistor, with feedback current drawn from the sense pin to a ground pin resistor loops also being fed to the transistor loop resistor;
   e) a transistor feedback diode receives feedback current from the transistor through a transistor feedback resistor connected by at least one ground resistor to ground in order to assist the transistor to receive a DC supply from the drive pin at consistent levels and to enable the transistor to turn off quickly upon the integrated circuit (IC) dropping the DC supply from the drive pin.

29. The LED driver circuit for fluorescent tube replacement of claim 28 in which:
   a) the transistor feeds the transistor's current output via two flyback diodes in series, wired in parallel with a series of a flyback capacitor and a flyback resistor to join the positive DC output lead, and also feeds the transistor's current output to an A-side input of the DC to DC transformer having an A-side output connected to a negative output lead for the LED light source;

b) the A-side output of the DC to DC transformer is also connected to an output pin capacitor, a polarized electrolytic capacitor, and an LED output bridging resistor, each of the output pin capacitor, a polarized electrolytic capacitor, and an LED output bridging resistor being bridged in parallel to the positive output pin in order to stabilize output current for the LED light source at a voltage appropriate for the LED array.

30. The LED driver circuit for fluorescent tube replacement of claim 25, in which:
a) the rectifier circuit is on a first printed circuit board (PCB) located in the first end cap and the constant current circuit is on a second printed circuit board (PCB) located in the second end cap, with two conductor wires running the length of the tube to connect a first pair of electrode pins on the second end cap to their respective input diodes in the rectifier circuit and two short conductors connecting a second pair of electrode pins on the first end cap to their respective input diodes in the rectifier circuit;
b) current output from the rectifier circuit via two rectifier output wires connected to a first 2-pin connector connected at a first end of an LED array board to two conductors to a second 2-pin connector at an opposite end of the LED array board, second 2-pin connector being connected to an input side of the constant current circuit, and an output side of the constant current circuit being connected by a third 2-pin connection to a positive terminal and a negative terminal for electrical supply to the LED array board.

\* \* \* \* \*